US007840515B2

(12) United States Patent
Ozdemir et al.

(10) Patent No.: US 7,840,515 B2
(45) Date of Patent: Nov. 23, 2010

(54) SYSTEM ARCHITECTURE AND PROCESS FOR AUTOMATING INTELLIGENT SURVEILLANCE CENTER OPERATIONS

(75) Inventors: Hasan Timucin Ozdemir, Plainsboro, NJ (US); Kuo Chu Lee, Princeton Junction, NJ (US); Hongbing Li, Belle Mead, NJ (US); Lipin Liu, Belle Mead, NJ (US)

(73) Assignee: Panasonic Corporation, Osaka (JP)

( * ) Notice: Subject to any disclaimer, the term of this patent is extended or adjusted under 35 U.S.C. 154(b) by 951 days.

(21) Appl. No.: 11/676,043

(22) Filed: Feb. 16, 2007

(65) Prior Publication Data

US 2008/0201277 A1 Aug. 21, 2008

(51) Int. Cl.
*G06F 17/00* (2006.01)
*G06N 5/02* (2006.01)

(52) U.S. Cl. .............................. 706/47; 706/12; 706/13

(58) Field of Classification Search .................. 706/11, 706/12, 13, 47; 348/143, 150; 434/236
See application file for complete search history.

(56) References Cited

U.S. PATENT DOCUMENTS

| | | | | |
|---|---|---|---|---|
| 5,388,198 | A | 2/1995 | Layman et al. | |
| 5,465,358 | A | 11/1995 | Blades et al. | |
| 5,978,595 | A | 11/1999 | Tanaka et al. | |
| 7,015,806 | B2 | 3/2006 | Naidoo et al. | |
| 2004/0223054 | A1* | 11/2004 | Rotholtz | 348/143 |

OTHER PUBLICATIONS

Rakesh Agrawal, Dimitrios Gunopulos, Frank Leymann: Mining Process Models from Workflow Logs; Proc. of the sixth Int'l Conf. on Extending Database Technology (EDBT), Valencia, Spain, Mar. 1998.

W. Aalst, T. Weijters, L. Maruster, Workflow Mining: Discovering Process Models from Event Logs; IEEE Transactions on Knowledge and Data Engineering, Sep. 2004, pp. 1-38.

Gianluigi Greco, Antonella Guzzo, Luigi Pontieri, Domenico Sacca: Discovering Expressive Process Models by Clustering Log Traces; IEEE Transactions on Knowledge and Data Engineering, vol. 18, No. 8, pp. 1010-1027 (Aug. 2006).

L. P. Kaelbling, M.L. Llttman, A.W. Moore: Reinforcement Learning: A Survey; Journal of Artificial Intelligence Research vol. 4, (1996), pp. 237-285.

Patrick Henry Winston; "Artificial Intelligence" 3rd Edition, Addison-Wesley Publishing Company, (1992), ISBN 0-201-53377-4, pp. 167-170.

* cited by examiner

*Primary Examiner*—Donald Sparks
*Assistant Examiner*—Ola Olude Afolabi
(74) *Attorney, Agent, or Firm*—Harness, Dickey & Pierce, P.L.C.

(57) ABSTRACT

The intelligent, automated surveillance system collects the interactions between the security personal and the surveillance system during the handling of an alarm. Each alarm is modeled as a "transaction" and each operation/action that a security personal executes modeled as an "event" within the transaction. The collected events within the transaction are in partial order. Furthermore, the system provides a scoring system for a security manager to evaluate the performance of the security guard. The score of the sequence of actions that the security guard performed manually and the system performed automatically for each set of dependent alarms are used to decide future sequence of operation. Security guards can overwrite the automatic sequencing of actions with manual sequence of operations.

26 Claims, 6 Drawing Sheets

206 208 210 212 214 216 218

| OperatorId | AlarmId | AlarmType | Location | Time | ActionType | ActionParameters |
|---|---|---|---|---|---|---|
| O1 | 1 | 1 | L1 | T1 | A1 | P1 |
| O1 | 1 | 1 | L1 | T1 | A2 | P2 |
| O1 | 1 | 1 | L1 | T1 | A3 | P3 |
| O1 | 2 | 3 | L2 | T2 | A2 | P4 |
| O1 | 2 | 3 | L2 | T2 | A3 | P3 |
| O2 | | | | | | |
| | | | | | | |
| | | | | | | |
| | | | | | | |

204

SYSTEM ARCHITECTURE AND PROCESS FOR AUTOMATING INTELLIGENT SURVEILLANCE CENTER OPERATIONS

FIELD

The present disclosure generally relates to electronic surveillance systems, and relates in particular to automated, intelligent surveillance center operations.

BACKGROUND

The statements in this section merely provide background information related to the present disclosure and may not constitute prior art.

Current surveillance center operation involves one or more security guards monitoring multiple video displayed in multiple windows. This process is labor intensive and has limited accuracy in detecting abnormal and transient behavior patterns. Such inefficient monitoring processes can be improved by organizing the display more intelligently and automated video motion detection and/or intelligent video analytic techniques that can detect abnormal behavior.

The state of the art system can only detect a predefined set of behaviors in controlled environment with limited success. However, there are no systems today that incorporate an automated alarm and operator operation learning and automation system and process that take various alarm information and user interactions as input and generate a set of rules that can be used to automate the intelligent surveillance center operation.

The handling of surveillance alarms by the security personnel depends on the application area. So far, surveillance system providers are trying to predict needs and provide the features based on such perceived needs of the system. However, extracting requirements from customers is cumbersome, not reliable, and changes from application to application.

Previous systems have represented processes through pure directed graphs, which are allowed to express precedence relationships only by disregarding richer control flow constructs, such as concurrency, synchronization, and choice. Also, a special kind of Petri nets, named Workflow nets (WF-net), has previously been adopted for modeling and mining workflow processes. In this technique, each transition represents a task, while the relationships between the tasks are modeled by arcs and places. WF-nets allows for recursive schemas and iterated executions. A basic algorithm, called $\alpha$-algorithm, has also been introduced, which is able to derive a WF-net from a workflow log, under the assumption that the log is complete and free of noise. A workflow schema which is similar to the Petri net representation has also been proposed. An additional previous technique, Mentor Performance Enhancing Software of DvTel (www.dvtel.com), is an intelligence gathering tool which provides insight about the operations and performance of system users. The Mentor Screen Recording System provides a non-invasive view of any networked PC which can be seamlessly synchronized with all of the systems video, audio, and data in both live and archived modes.

What is needed is a system and method that captures the alarm handling process followed by surveillance personnel and automates some of the alarm handling process steps to increase the efficiency of security monitoring operations.

SUMMARY

The intelligent, automated surveillance system collects the interactions between the security personal and the surveillance system during the handling of an alarm. Each alarm is modeled as a "transaction" and each operation/action that a security personal executes modeled as an "event" within the transaction. The collected events within the transaction are in partial order. Furthermore, the system provides a scoring system for a security manager to evaluate the performance of the security guard. The score of the sequence of actions that the security guard performed manually and the system performed automatically for each set of dependent alarms are used to decide future sequence of operation. Security guards can overwrite the automatic sequencing of actions with manual sequence of operations.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a block diagram illustrating an intelligent, automated surveillance system.

FIG. **2*a*** is a block diagram illustrating association of operators with alarm handling rules.

FIG. **2*b*** is a graphical representation illustrating an alarm handling session database.

FIG. **3*a*** is a block diagram illustrating a logical function diagram of components of the intelligent, automated surveillance system.

FIG. **3*b*** is a block diagram illustrating attribute of an intermediate node in an alarm handling process model.

DETAILED DESCRIPTION

The following description is merely exemplary in nature and is not intended to limit the present disclosure, application, or uses.

Throughout this disclosure, the term "expert system" is used for rule-based systems. Rules represent knowledge and rule-based system solves problems by using rule chaining. In contrast, the process of extracting rules from domain experts is known as "knowledge engineering," which is defined herein as the extraction of useful knowledge form domain experts for use by computers. Sometimes, knowledge engineers cast acquired knowledge in the form of rules for rule-based systems. This disclosure describes how to extract alarm handling rules for surveillance systems from collected log data. The extraction technique uses Weighted Directed Graph representation to mine alarm handling rules from log data.

Figure 1:
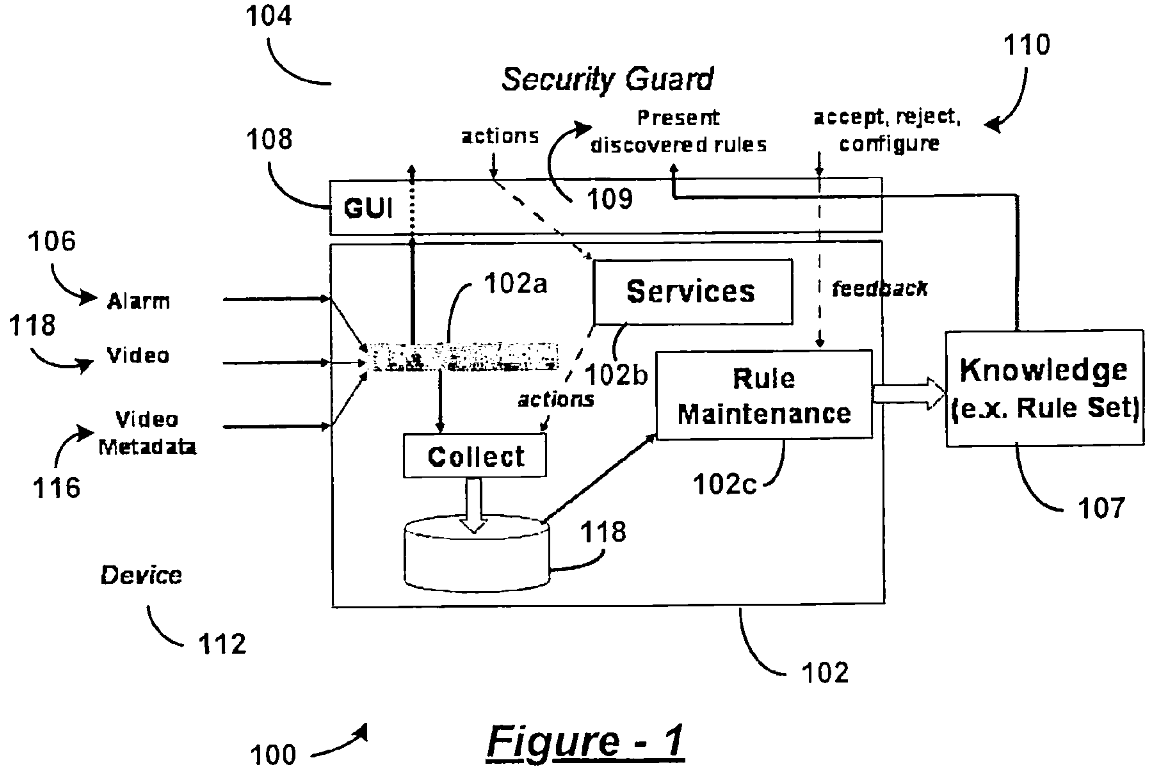

Referring now to FIG. 1, the security system 100 has a learning module 102 that iteratively learns the common operations executed by the security personnel 104 during the handling of a set of dependent alarms 106 and security manager scores 110. The learning module 102 extracts the rules 107 from the learned operation sequences 118 and presents it to user as a possible automation 109 via graphical user interface 108. When a security person agrees with the presented automation steps, then the system 100 adds this rule to the profile of this person. During the handling of alarm 106, the system 100 uses these rules to automate some part of the alarm handling process.

There are three learning modules. Alarm sequence learning module 102*a* learns the sequence of input alarms that interests the security personnel 104, together with the media capture device 112, media content 114, and media metadata 116 for each generated alarm 106. Action sequence learning module 102*b* learns the sequence of actions 105 taken by the security personnel 104 reacting to the sequence of alarms. Rule maintenance learning module 102*c* learns the results of learning modules 102*a*-102*b*, and a score 110 assigned by a security manager evaluating the security personnel's response. Rule maintenance learning module 102*c* propagates the score to the two, lower level learning modules 102*a*-102*b*. Service in 102*b* includes services such as Video Motion Detection Alarm Configuration Service, Flow Detection Service. Face Recognition service, etc. The metadata generated from the results of the services is also logged as a metadata for further data mining processing that can be implemented in the rule set maintained in 102*c*. For example, for a system 100 with Video Motion Detection (VMD) defined in multiple cameras, learning modules 102*a*, 102*b*, and 102*c* learn the correlation of alarms generated by all VMD alarms and described the correlation in a table that is modeled as weighted graph representation in which an edge of graph represents the correlation between VMD alarms. A node of graph describes the type and properties of an alarm.

The stored data objects representing actions have attributes such as ActionType (switch to camera-X, do face search, etc.) and parameters of actions (such as make VoIP call to number-Y, send e-mail to x@y.com, etc). Action sequences can therefore describe the particulars of services performed by security personnel as illustrated by the following example action sequences: (a) when the operator-A receives a motion alarm from the camera-1, the operator-A zooms in the video feed from camera-1 disregarding the other camera views; (b) when the operator-B receives an abandoned package detection alarm from the camera-2, the operator-B: (1) zooms in the video feed from camera-2; (2) then, plays back the recorded video (−10 sec of alarm) from recorder-2 to find the person who left the package; (3) then pause the video playback when he/she finds a good face shot in an image of video; (4) then selects the face regions in the image and starts a face based similarity search operation in the personnel database and, (5) if there is no match in the personnel database for the given face (i.e. the similarity scores are too low for the given query face), then the operator-B starts another face based similarity search on suspicious persons database (this could be onsite or a Web2.0 service from a service provider); and (6) if a match is observed by the operator (i.e. the similarity scores are good, below some threshold), then: (i) the operator-B makes a VoIP call to the local police department; and (ii) the operator-B submits the recorded video data with the location information to the police department's Crime Prevention Web2.0 Service.

Figures 2A, 2B:
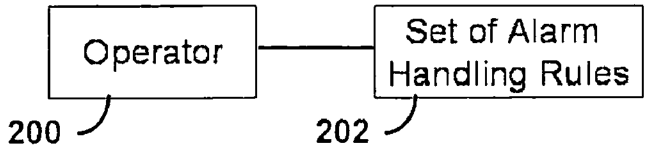

Turning now to FIG. 2*a*, learning of action sequences for an alarm handling is per person and per alarm type. Thus, each operator 200 has a set of alarm handling rules 202. Each operator 200 is identified by the login process so that the actions taken by an operator 200 during the handling of an alarm can associated with the particular operator 200.

Referring now to FIG. 2B, the system stores the transactions (alarm handling session) in a database 204. Database 204 can be a table or two dimensional data structure storing information about Operator ID 206, Alarm ID 208, Alarm Type 210, Location 212, Time 214, Action Type 216, and Action Parameters 218.

Figure 3A:
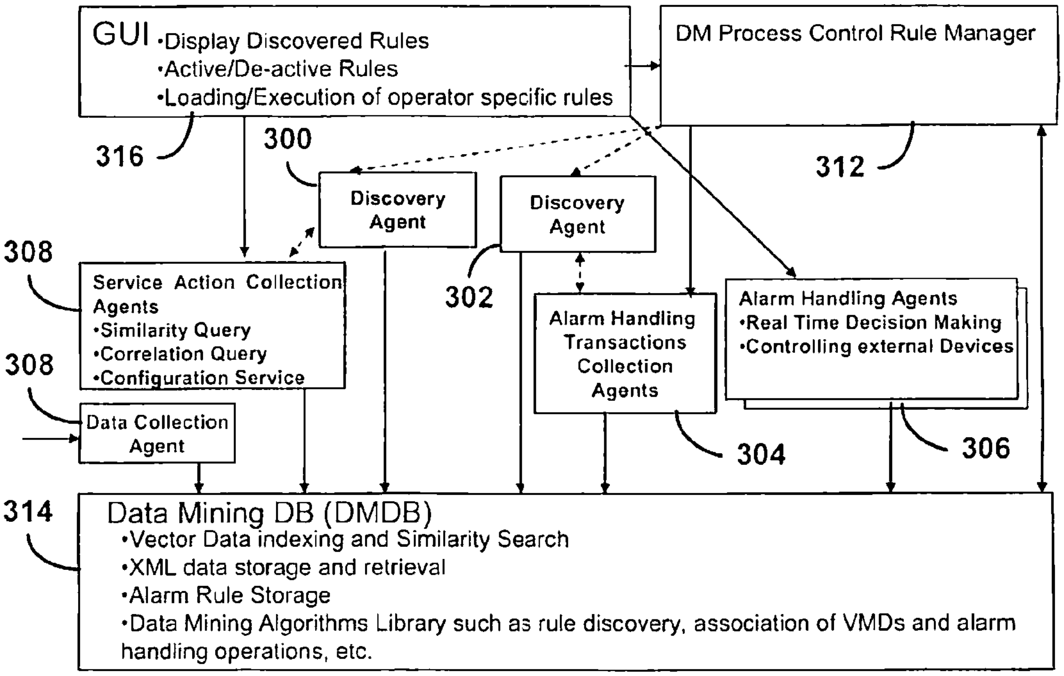

Turning now to FIG. 3*a*, the security system components compartmentalize the logical functions of the system. A multi-camera, distributed surveillance system, includes a surveillance metadata mining system, a real-time decision making and control system, and distributed data mining agents 300-310 that interact with multiple sub-function modules 312-316 in the surveillance system to automate analysis, learning, optimization, and control processes. For example, DM Process Control Rule Manager 312 instantiates the Discovery Agents 300 and 302 with selection criterion to select the metadata from Data Mining Database 314 and the specification of mining algorithm (including configurable parameters of algorithm) to execute the data mining operation. For example, the discovered potential automation rules are returned to DM Process Control Rule Manager 312 to present the discovered rules to the user by GUI 300 for verification of whether the rules should be included into the knowledge base. For example, Discovery Agent 302 processes the Video Motion Detection alarm data to obtain correlations between alarms in a table that contains the label of region and statistical data associated with the region.

A metadata mining system collects and constructs a context sensitive metadata model for multiple sensors and operators, loads service processing function modules, and creates a repository of alarm and behavior statistical function models in a metadata knowledge warehouse in Data Mining Database 314. The metadata mining system observes and controls dynamic association and loading of distributed data mining agents, service processing function modules, and statistical models for a subset of sensors and operators to automate a sequence of surveillance operations.

The surveillance system comprises interfaces and an execution environment for data mining agents to interact with service processing function modules, including alarm handling process logging, alarm handling automation, alarm handling process mining, action rules, and configuration model storage components. For example, graphical user interface (GUI) 316 displays discovered rules, activates and/or deactivates rules, and loads and executes operator specific rules. A surveillance system service application programming interface connects GUI 300 to other functional components, such as rule manager 312, which performs periodic and/or on-demand rule discovery, performs rule set maintenance, and is responsible for data mining process control. A data mining library can provide knowledge discovery algorithms, including rule discovery algorithms. Alarm handling transactions collection agent 304 inputs alarm handling transactions to data mining database 314. Alarm handling agents 306 perform real time decision making and control of external devices while inputting alarm handling rules to data mining database 314. Thus, data mining database 314 which performs vector data indexing and similarity search, performs XML data storage and retrieval, performs alarm rule storage, and maintains a data mining algorithms library such as rule discovery, association of VMDs, alarm handling operations, and others. Accordingly, statistical behavior of multiple regions can be analyzed and queried by service action collection agents using XML query and similarity search to support automatic marking of correlation of flow patterns between regions, thus providing a configuration service. Additional data can be collected by data collection agent 310 and supplied to data mining database 314.

There are a variety of action types that need to be described by the data object representing an action. For example, GUI Service API actions modify the rendered GUI to the user. Also, device service API actions are directed to a particular device or groups of device to execute a certain operation. Further, service API actions control the operations that are not directly associated with device and GUI. For instance, a service API action can be: (1) the initiation of rule discovery and execution of a rule discovery algorithm on a selected data set; (2) sending an e-mail notification with video data to a certain address. The former can be provided by an external service provider component, and thus the surveillance system service API becomes an aggregate service definition for the interacting components. The action can be re-configuration of motion detection threshold in VMD alarm rule, time threshold in directional VMD alarm rules, the region description of VMD alarm etc.

There can be various kinds of inputs to the security guard operation automation modules. For example, one type of input can be operation logs, which can be the data source of the data mining (alarm handling model mining). Also, another kind of input can be operator feedbacks, which are the feedbacks of security guard to the discovered alarm handling models. A further kind of feedback can be operator configurations, which are the queries or conditions in order to mine some conditional alarm handling models. Finally, alarms can be a type of input, and are automatically handled by the scoring engine with discovered alarm handling models.

There can be various types of outputs from the security guard operation automation modules. For example, one type of output can be rules/module, which are the data mining results presented to the operators. Also, another type of output can be automation control commands, which are triggered by the scoring engine with a new alarm coming in.

An input to the system can be the log of alarm handling steps (tasks/actions taken during the handling of an alarm by an operator/security guard). An alarm can be specified by alarm event type, location (camera, XY coordinates in camera field of view, three-dimensional location, etc.), time of alarm, and operator. This information can constitute the initial representation of context.

From the log data, a data mining algorithm can generate a graph based representation to find the patterns in the alarm handling process. The edges on the graph can represent the potential execution flow of process from one activity to another. Each edge can be associated with a confidence value, which determines the probability distribution this edge will be followed among possible multiple outgoing edges. In this case, if a vertex (activity) has more than one outgoing edge, the sum of the weights on all the edges can be 1.0. i.e. 100%.

Figure 3B:
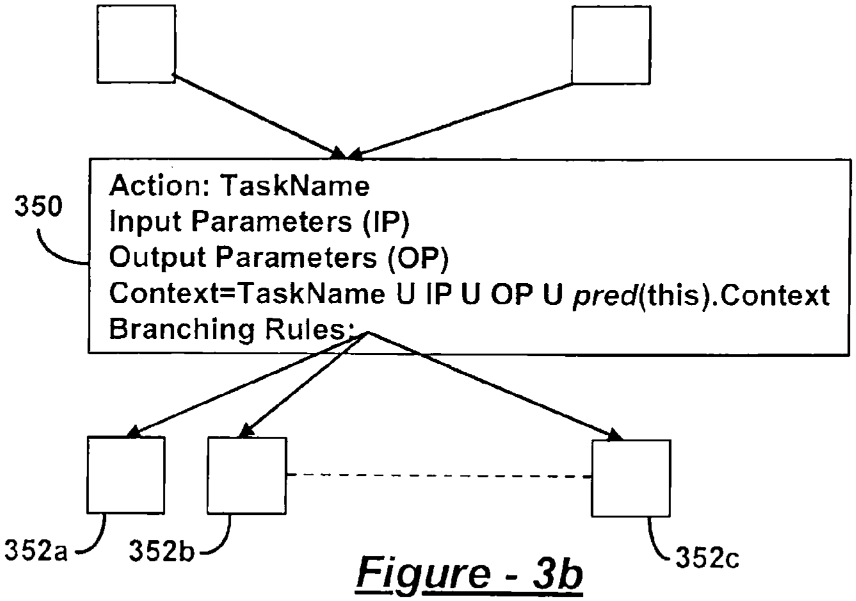

Referring to FIG. 3B, each intermediate node/vertex 350 can contain: (1) Action: task/method name; (2) Action.Input: Parameter values; (3) Action.Output: Parameter values; and (4) Context[ ]: reverse in the execution path. The start node of the graph is introduced for convenience. Regarding the context attribute of a node, in the start node, the context is defined by alarm event type, location, time, and operator attributes. In the intermediate nodes, the context is defined by the union of Input Parameter Values, Output Parameter Values, and context of the previous node. Branching Rules 352*a*-352*c* can define the next task to be executed by using the context information. Each rule can be associated with a probability that describes the confidence value.

Definition 1 (alarm handling process): an alarm handling process P is defined as a set of tasks $V_P = v_1, \ldots, v_n$, a weighted directed graph $G_P = (V_P, E_P)$, an output function $o_P: V_P \rightarrow N^k$, and $\forall (u, v) \in E_P$, a probability distribution function $f(u, v): N^k \rightarrow [0, 1]$. $(P(u \rightarrow v|Ci): N^k \rightarrow [0, 1])$.

Definition 2 (direct following): given the execution logs of the same alarm handling process, task B directly follows task A if task B starts after A terminates in one execution in which they both appear, and no activity exists between task A and task B.

The alarm handling logs usually consist of multiple alarm handling processes for different alarm types handled by different operators. The output of algorithm depends on which records from alarm log data are used to generate the graph representation. For example, if only logs associated with a particular operator are selected, then, the graph summarizes the process of alarm handling by a selected operator. Then, the graph presents the common steps in handling different alarm types, the differences in handling of the same alarm type depending on the time, location, outcome of previous executed tasks (within the same execution trace), etc. As another example, if only logs of a particular alarm type are selected, then the graph summarizes the process of alarm handling for a given alarm type.

In an example process for constructing weighted, directed graphs:

Given a log L of some alarm handling processes, find the weighted directed graphs for each alarm handling process model $G_1, \ldots, G_n$. Each $G_i$, i=1 . . . . n is corresponding to the alarm type $\alpha_1, \ldots \alpha_n$. For each graph $G_i$, i=1 . . . . , n:

1) Start with the graph $G_i = (V_i, E_i)$, with $V_i$ being the set of activities of the handling process of alarm type $\alpha_i$ and $E_i = \phi$. (V is instantiated as the log is being scanned in the next step.) i.e., for the possible activities pairs u, $v \in V_i$, f(u, v)=0. And the counter function from u to v also being initialized to $\rho(u, v)=0$.

2) For each process execution in L, if this process execution is for alarm type $\alpha_i$, and for each pair of direct following relationship tasks u, v appear in this execution, $\rho(u, v) = \rho(u, v) + 1$;

3) Compute the weight from task u to activity v.

3.1 For each activity in the graph $G_i$, for example u, get the total counter $$sum_u = \sum_{j=1}^{m} p(u, v_j) \cdot v_j (j = 1, \ldots, m)$$

is all the direct following node of u in the graph $G_i$.

3.2 The weight from task u to activity $v_i$; (j=1 . . . . , m) is calculated as $$f(u, v_j) = \frac{p(u, v_j)}{sum_n}.$$

4) Return the graph $G_i$.

In the previous algorithm, function $f(u, v): N^k \rightarrow [0, 1]$ is the probability function $f(u,v) = P(u \rightarrow v)$ in which the value represents the probability of node v is following node u.

The alternative representation can model function as $f(u,v) = P(u \rightarrow v|Ci)$ where Ci denotes the condition in which the current context matches within the condition of branching rule BRi that describes when Ci is true which node to go and probability of following this link.

The Branching rules for the entry/start node are extracted from the following data in table form:

TABLE 1

| Selected Data from alarm transactions for entry/start node | | | | | | | | | | | | | |
|---|---|---|---|---|---|---|---|---|---|---|---|---|---|
| | | Location | | Time Stamp | | | | | | | | | |
| Alarm Transact Identifier | Alarm Event Type | Camera Id | XY in FOV Or 3D coordinate | Year | Month | Day Of Month | Day Of Week | Hour | Minute | Operator Identifier | Acknowledged | Next Node |
| | | | | | | | | | | | | |

The alarm transaction identifier uniquely identifies the detected alarm event. The alarm event type is from alarm ontology in the surveillance system. Camera identifier denotes which camera produced an alarm. The location also contains coordinates associated with an object that caused an alarm. The coordinates can be in XY coordinate value in the field of view of camera or 3D location of an object when camera supports such information. Time stamp denotes when an alarm happened. Operator identifier denotes which security operator handled the alarm. Acknowledged column denotes whether an operator acknowledge the alarm event. Next Node denotes the next action node that is executed. When an alarm is not acknowledged (i.e. it is assessed as a false alarm), there will not be a next action node that is indicated with a special value such as −1 or null.

The example table is obtained from alarm transaction records. The Branching rules for the start node can be obtained for example by using Bayesian clustering or Decision Tree induction algorithms. In case of Bayesian clustering approach, the set of clusters are obtained from the Next Node column by removing the duplicate/repeated node identifiers. Then the decision boundaries are obtained by using the Bayesian clustering algorithm. The output of algorithm explains the conditions (combination of attributes, alarm event type, location, time stamp, operator identifier, etc.) to assign given input vector to a cluster. The probability of each branching rule is extracted by dividing the number of correct classification by the number of cases in the example table. When decision tree induction algorithms are used, the nodes of decision tree contains the conditions (on decision attributes) and the leaf node of decision tree contains the next node and its probability value. The described algorithms such as Bayesian clustering and decision tree induction are exemplary, it should be understood that the similar approach can be realized by other algorithms also. Condition of a branching rule can be in the form "and" and "or" operators, and each condition check values of attributes (obtained from attributes in context) with {=, <, >, <=, >=} operators depending on the attribute type description.

Branching rules for intermediate nodes are extracted from the following data represented as table format;

The example Table-2 is obtained as follows from logs of alarm handling transactions for current action node v. From Table-1, the attribute columns in alarm transaction identifier, alarm event type, location, time stamp, and operator identifier are collected. For the current node (v), the attributes of action, (service name, name of action, Input parameter values, and output parameter values) are collected. The attributes of action may include the operator identifier in case the alarm is handled by more than one operator. The same data for the previous actions (v-1, v-2, . . . , v-k) (extracted from alarm transaction log data) for last k steps are also collected. The next node column describes the next node in the graph.

The branching rules for intermediate nodes are obtained by using the data described in Table-2 and example algorithms described before for discovery of branching rules of the entry/start node.

The discovered graph representation is stored in Data Mining DB.

For automation of steps in the alarm handling process, the user queries the graph by using the minimum confidence level. Then, the results can display the graph with the edges having equal or better confidence level highlighted and existing rules displayed. The user can then identify which steps should be automated. The system can respond by converting the selected steps to production rules by using conditions specified in the branching rules. The system can analyze the example logs and find relationships between attributes in the context of previous nodes and input parameters of automated tasks. These discovered relationships enable automatic determination of values of input parameters. The discovered relationships between attribute values can be confirmed with the user. These rules can then be stored in the operator's knowledge base.

Each rule can contain a condition and action part. The action part of a rule can specify: (1) execution of a single task without user's input (total automation); (2) execution of a single task with some input from the user (semi-automation);

TABLE 2

| Selected data from alarm transactions for intermediate nodes | | | | | | | | |
|---|---|---|---|---|---|---|---|---|
| | Action Attributes | | Action Attributes | Current Action Attributes in current node (v) | | | | |
| From Table-1 | Previous Node (v(−k)) | Action Attributes Previous node(v(−2)) | Previous node (v(−1)) | Service Name | Name | Input Parameters | Output Parameters | Next Node |
| | | | | | | | | |

(3) execution of a series of tasks without the user's input (total automation); (4) execution of a series of tasks with some input from the user (semi-automation).

Discovery of default parameter assignment can be performed to find the value assigned to an input parameter of a task to be executed by using the collected log data. This problem is defined as an association rule mining problem in which the purpose is to find "set(X,value1)→set(Y,value1)" in which Y represents an input parameter and X represents an attribute in the context that is comprised of alarm type, alarm time, camera identifier, location of alarm, operator identifier, data (action name, values of input and output parameters) of a sequence of executed actions. The implication of the discovered rule is that ValueOf(Y)=ValueOf(X). The conclusion of discovery (for an input attribute) is: (a) a value can be obtained from values of attributes observed in the execution log data; or (b) the user needs to be involved for the assignment.

The action descriptions can be stored by a configuration component to define the actions to be used for the automation. The set of action descriptions can be automatically extracted from surveillance system service description (by using the Interface Definition Language (IDL), such as WSDL format) to load generate the initial set of action descriptions. Then, the actions can be selected for inclusion in automation or not. Thus an action definitions table can specify service name, action name, input and output parameter definitions, and whether it is included in the automation or not.

To illustrate the principle of alarm handling process mining, we consider the alarm-handling log shown in table 5. Table 3 and Table 4 give some example alarm types and task Ids.

TABLE 3

Some example alarm types

| Alarm Type | Alarm Description |
|---|---|
| type 1 | tailgating |
| type 2 | abandoned package |
| type 3 | door (pachinko machine) open |

TABLE 4

Some example task IDs

| Task ID | Task Description |
|---|---|
| task A | Monitor control, show the camera video on big window |
| task B | Play back the recorded video (−5 secs of alarm) |
| task C | Take a snap shot on good face |
| task D | Face similarity search on access control database |
| task E | Paging a ranger |
| task F | Annotating the video and archiving the video |
| task G | Ignore the alarm |

TABLE 5

Some example alarm handling logs

| Operator ID | Time | Alarm ID | Alarm Type | Camera ID | Task ID |
|---|---|---|---|---|---|
| operator 1 | 8:50 | alarm 1 | type 1 | camera 1 | task G |
| operator 2 | 9:30 | alarm 2 | type 1 | camera 2 | task A |
| operator 2 | 9:30 | alarm 2 | type 1 | camera 2 | task G |
| operator 1 | 22:15 | alarm 3 | type 1 | camera 6 | task E |

TABLE 5-continued

Some example alarm handling logs

| Operator ID | Time | Alarm ID | Alarm Type | Camera ID | Task ID |
|---|---|---|---|---|---|
| operator 1 | 22:18 | alarm 3 | type 1 | camera 6 | task F |
| operator 2 | 10:30 | alarm 4 | type 1 | camera 2 | task A |
| operator 2 | 10:30 | alarm 4 | type 1 | camera 2 | task E |
| operator 2 | 10.32 | alarm 4 | type 1 | camera 2 | task F |
| operator 2 | 11:05 | alarm 5 | type 1 | camera 3 | task A |
| operator 2 | 11:05 | alarm 5 | type 1 | camera 3 | task B |
| operator 2 | 11:05 | alarm 5 | type 1 | camera 3 | task C |
| operator 2 | 11:05 | alarm 5 | type 1 | camera 3 | task D |
| operator 2 | 11:05 | alarm 5 | type 1 | camera 3 | task E |
| operator 2 | 11:10 | alarm 5 | type 1 | camera 3 | task F |
| operator 2 | 15:20 | alarm 6 | type 1 | camera 3 | task A |
| operator 2 | 15:20 | alarm 6 | type 1 | camera 3 | task B |
| operator 2 | 15:20 | alarm 6 | type 1 | camera 3 | task C |
| operator 2 | 15:20 | alarm 6 | type 1 | camera 3 | task D |
| operator 2 | 15:20 | alarm 6 | type 1 | camera 3 | task G |
| operator 2 | 16:08 | alarm 7 | type 1 | camera 4 | task A |
| operator 2 | 16:08 | alarm 7 | type 1 | camera 4 | task C |
| operator 2 | 16:08 | alarm7 | type 1 | camera 4 | task D |
| operator 2 | 16:08 | alarm 7 | type 1 | camera 4 | task E |
| operator 2 | 16:10 | alarm 7 | type 1 | camera 4 | task F |
| operator 1 | 19:50 | alarm 8 | type 1 | camera 6 | task E |
| operator 1 | 19:55 | alarm 8 | type 1 | camera 6 | task F |
| operator 1 | 8:55 | alarm 9 | type 1 | camera 1 | task G |
| operator 1 | 17:30 | alarm 10 | type 1 | camera 5 | task C |
| operator 1 | 17:30 | alarm 10 | type 1 | camera 5 | task D |
| operator 1 | 17:30 | alarm 10 | type 1 | camera 5 | task G |

The logs in table 5 contain information about one alarm type (tailgating) when occurring from different cameras at different times (rush hour, office-closing time and ordinary office hour) and being handled by different operators (operator 1 and operator 2) with different task sequence models. There are a total of 10 alarm handling cases in the table 5: Alarm case 1: G; Alarm case 2: A G; Alarm case 3: E F; Alarm case 4: A E F; Alarm case 5: A B C D E F; Alarm case 6: A B C D G: Alarm case 7: A C D E F; Alarm case 8: E F; Alarm case 9: G; and Alarm case 10: C D G.

Figure 4:
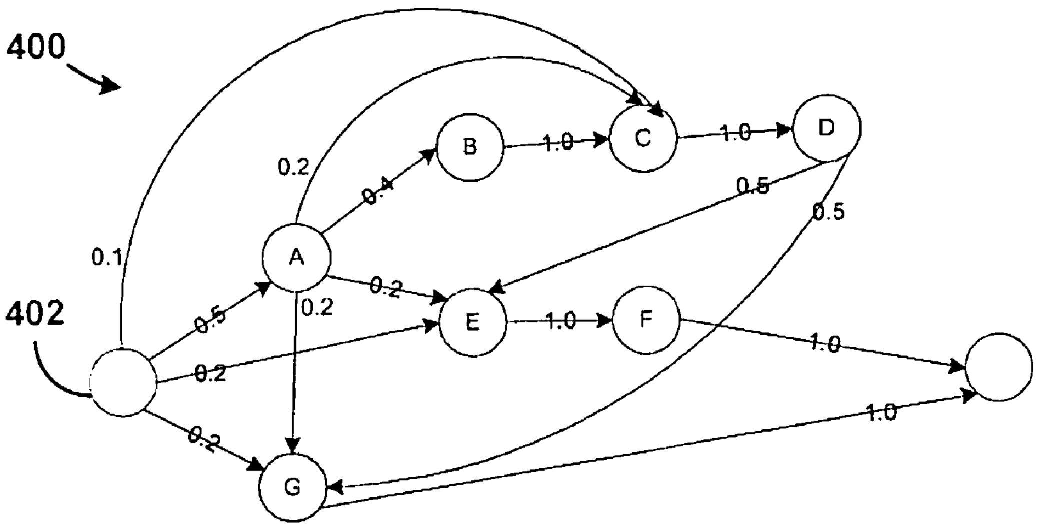
FIG. 4 is a block diagram illustrating an alarm handling process model corresponding to the log in Table 5.

Turning now to FIG. 4, based on the information show in table 5 and by making some assumptions about the completeness of the log, we can discover alarm handling process model 400, which is a WDG (Weighted Directed Graph). Alarm handling process model 400 can be interpreted as: when an alarm (tailgating) happens at 402, there is a 10% chance to execute the task C, 50% chance to run the task A, 20% chances to run task E and 20% chances to run task G. After task E, there are 100% chances to run task F etc.

The alarm handling logs usually consist of multiple alarm handling processes for different alarm types. Table 5 only contains the process for one alarm type. However, alarm handling process models can be discovered for different alarm types. Also, cyclic relationships between activities can exist. Our definition of direct following also allows cyclic relationships. In other words, it is possible that activity B may directly follow activity A and activity A also direct follow activity B in the same alarm handling process model.

As defined herein, a data mining query means data mining from extracted data subsets. In practice, system users can be interested in the alarm handling process model under a set of conditions instead of an entirety of the alarm handling logs. For example, a security manager can monitor the alarm handling process of individual security guards.

Figure 5:
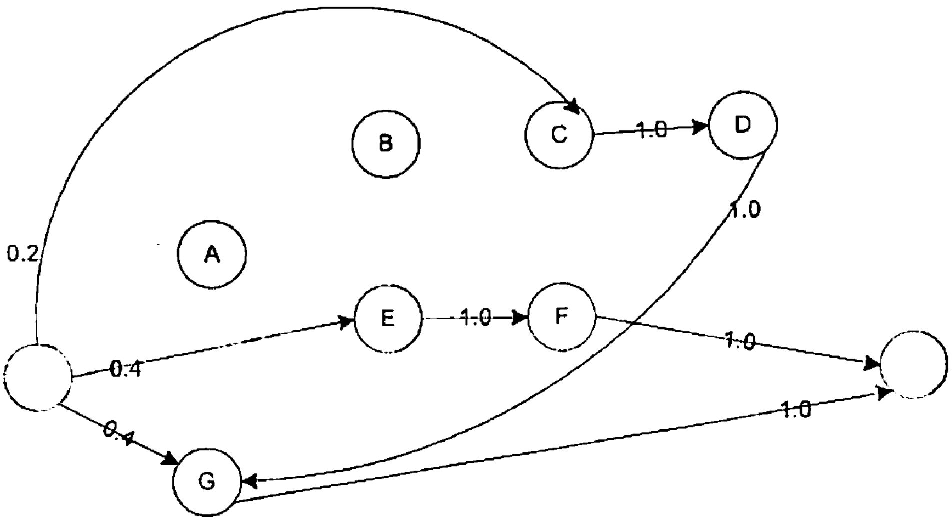
FIG. 5 is a block diagram illustrating an alarm handling process model mined from Table 5 for Operator 1.
Figure 6:
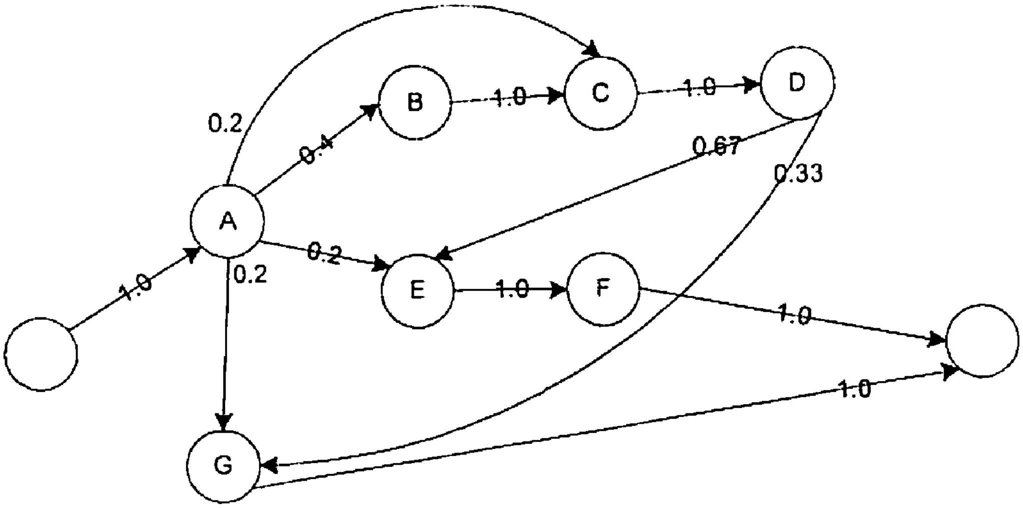
FIG. 6 is a block diagram illustrating an alarm handling process model mined from Table 5 for Operator 2.

Referring generally now to FIG. 4-6, FIG. 4 gives the alarm handling process graph model based on the whole log data from table 5. If only the operator 1's alarm handling log data being mined, the process graph model of FIG. 5 is obtained.

Figure 7:
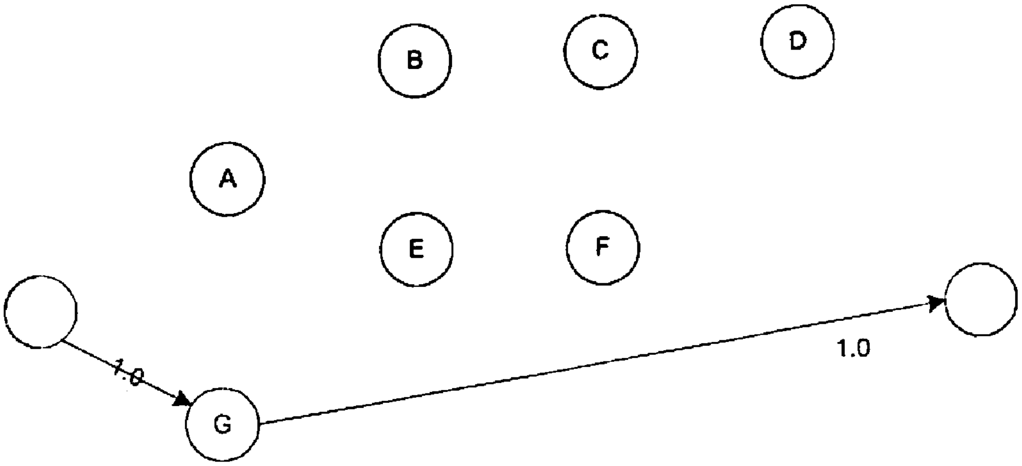
FIG. 7 is a block diagram illustrating an alarm handling process model mined from Table 5 for peak into-office time.
Figure 8:
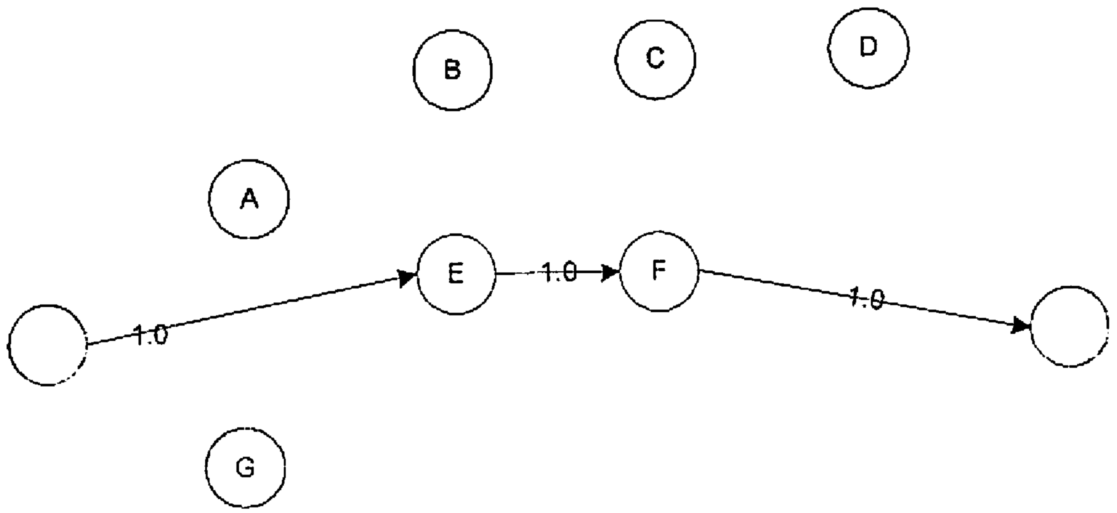
FIG. 8 is a block diagram illustrating an alarm handling process model mined from Table 5 for close-office time.

We can similarly discover the alarm handling process of operator 2 from table 5, as illustrated in FIG. 6. On the other hand, if we are interested in the alarm handling process models from the temporal aspect instead of different operators, the alarm handling process model of FIG. 7 for peak into-office time (8:50 am to 9:00 am) and FIG. 8 for close-office time (19:00 pm to 8:00 am second day) can be discovered from the example log data in table 5. Thus, the manager can observe differences in the alarm handling process models during different time frames.

As can be realized from the foregoing description, the system and method for automated surveillance system operation is advantageous systems and methods in several ways. For example, the intelligent data mining based alarm processing system can increase the productivity of the security guard because it can automatically execute some steps of alarm handling processes. Also, the system can adapt to new types of sequences of actions performed by security guards upon the sequence of alarms. Additionally, the security manager can monitor the effectiveness of the security guard, and the system can automatically adapt to a new reaction sequence that is preferred by the manager. Further, the system can react to complex events much faster than the security guard manually. Yet further, alarm handling process models can be automatically discovered from the alarm handling logs of operators. Further still, the mined alarm handling process models can be used to automatically handle the logs, thus reducing the labor cost through automation. Even further, the mined alarm handling process models can represent the knowledge discovered from the historic data, and can be used to training security personals and provide advices to the security guards, thus improving the alarm handling efficiency. Even further still, a security manager can monitor the performance of the security guard by mining the individual security guard alarm handling process models through DM query. Yet even further, the security system can incrementally learn the security guard alarm handling process models, provide advice to the security guards, and automatically handle alarms based on the discovered process models.

From the foregoing, it should be readily understood that some embodiments can be an automated surveillance system having one or more media capture devices that capture media, and that generate media metadata and alarms. It can also have a graphical user interface communicating the alarms and the captured media to security personnel together with alarm handling rules. It can further have a learning module that iteratively learns operation sequences executed by the security personnel during the handling of a set of alarms, extracts alarm handling rules from the operation sequences, and presents the alarm handling rules to the security personnel via said graphical user interface. This learning module can present the alarm handling rules to the security personnel as a possible automation, and the system can use the rules to automate at least part of the alarm handling process when the security personnel expresses agreement with the automation via said graphical user interface. The learning module can add the rules to a profile of security personnel in response to the security personnel expressing agreement with the automation.

The learning module can include an alarm sequence learning module that learns the sequence of input alarms that interest the security personnel, together with the media capture device, media content, and media metadata for each generated alarm. It can also include an action sequence learning module that learns a sequence of actions taken by the security personnel reacting to a sequence of the alarms. It can further include a rule maintenance learning module that learns the sequence of input alarms, the sequence of actions taken by the security personnel, and a score assigned by a security manager evaluating the security personnel's response. The learning module can extract the alarm handling rules by discovering an alarm handling process model in the form of a weighted, directed graph.

The system can have additional components. For example, it can have a feedback mechanism for presenting at least part of the alarm handling process model to the security personnel. Thus, the security personnel can accept, reject, or update the alarm handling process model. Also, it can have a data mining query mechanism setting data mining conditions on specified data as opposed to an entirety of operation logs. Further, it can have a scoring engine that handles incoming alarms to automatically execute control commands, including PTZ controls, recording controls, monitor controls, and snap shot controls.

It should also be readily understood that some embodiments of the invention can be a multi-camera, distributed surveillance system having a surveillance metadata mining system, a real-time decision making and control system, and distributed data mining agents that interact with multiple sub-function modules in the surveillance system to automate an analysis, learning, optimization, and control process. The metadata mining system can collect and construct a context sensitive metadata model for multiple sensors and operators, load service processing function modules, and create a repository of alarm and behavior statistical function models in a metadata knowledge warehouse. This data mining system can observe and control dynamic association and loading of distributed data mining agents, service processing function modules, and statistical models for a subset of sensors and operators to automate a sequence of surveillance operations. Further, the surveillance system can have interfaces and an execution environment for the data mining agents to interact with service processing function modules, including alarm handling process logging, alarm handling automation, alarm handling process mining, action rules, and configuration model storage components.

The system can have an alarm handling process logging component that creates alarm records, assigns a unique session identifier for each stored alarm incident, and stores actions taken by a security operator during the handling of an alarm. This alarm handling process logging component can store each alarm with alarm type, alarm time, camera, location within field of view of camera, and assign a unique identifier for each stored alarm, receive actions taken by the operator from an alarm handling automation component, store each action information that includes alarm identifier, operator identifier, time stamp, action name, input parameter values, and, output parameter values, and send events when an alarm record is created and when an action record is created. The system can also have an alarm handling automation component that is connected to the alarm handling process logging component to store the actions taken by the security operator, that executes matching alarm handling automation rules, that interacts with the operator to display at least part of a discovered alarm handling process model and obtain feedback of the operator, that is connected to an alarm handling process mining module to start building of alarm handling process models and to retrieve discovered alarm handling process models, and that is connected to a rule storage component to store and retrieve alarm handling automation rules. This alarm handling automation component can maintain an alarm handling session by creating an alarm handling session object when a new alarm is received. This alarm handling session object can record alarm type, alarm time, camera identifier, alarm location, operator identifier, and context information that includes actions taken and input and output parameter values of executed actions during an alarm handling process. Also, the alarm handling automation component can collect alarm handling process action data by: (1) collecting data associated with executed actions during handling of a particular alarm by using a unique identifier, wherein the actions include at least one of actions initiated by the security guard and automatically executed actions enacted according to automation rules, and data associated with an executed action includes an action/method name, input parameter values, and output parameter values; (2) sending a message to an alarm handling process logging component, wherein the sent message comprises of alarm identifier, operator identifier, time stamp, action name, input parameter values, and output parameter values; and (3) sending a message to the alarm handling process logging component, the sent message being indicative of termination of an alarm handling process for a particular alarm by using a unique identifier of the alarm. Further, the alarm handling automation component can execute matching rules by: (1) employing a rule matching component that can be configured with a set of rules and supports a rule matching function and a function to re-normalize strength values of a set of rules; (2) retrieving alarm handling automation rules from rule storage associated with the operator and loading the retrieved rules into the rule matching component; (3) retrieving the matched rules from a rule engine by using data collected in an alarm handling session object, including alarm type, alarm time, camera identifier, alarm location, operator identifier, and sequence of actions taken so far, wherein each item in the sequence records action name, values of input, and output parameters; (4) if only one rule is matched, executing actions associated with the matched rule and incrementing a strength attribute of the rule; (5) if more than one rule is matched, listing the rules based on their strength values and asking the user to select which one to execute; and (6) if the user selects one of the rules, then executing actions associated with the selected rule and incrementing its strength attribute. Additionally, the alarm handling automation component can create a new automation rule by: (1) submitting alarm handling process discovery requests to an alarm handling process mining component for ad-hoc alarm handling process mining, the request comprising of selection criteria regarding at least one of alarm type, time interval, or operator identifier; (2) submitting an alarm handling process model retrieval request to an alarm handling process mining component for continuous alarm handling process mining, the request comprising selection criteria regarding at least one of alarm type, time interval, or operator identifier; (3) displaying the discovered alarm handling process model with a threshold on confidence value, with matching execution paths highlighted, and with rules already in effect rendered in a distinctive manner; (4) interacting with a security operator in order to automate one or more execution paths in the discovered alarm handling process model; (5) sending selected steps to an alarm handling process mining process to discover default values for input parameter of actions; (6) displaying discovered default parameter values; (7) collecting selections from the operator regarding whether to automate the assignments by accepting or modifying the values; (8) sending the selections to the alarm handling process mining module to obtain a rule; (9) displays the new rule to the user for final confirmation; and (10) if the user accepts the new rule, saving the new rule to a rule storage component, and loading the new rule to a rule engine.

The system can have an alarm handling process mining component that discovers an alarm handling process model from alarm handling process log data, process on-going alarm handling process mining requests and stores associated models, return discovered alarm handling process models associated with alarm handling process mining requests, and extract rules from discovered alarm handling process models. This alarm handling process mining component can handle ad-hoc alarm handling process discovery by: (1) selecting alarm handling log data from an alarm handling process logging component by using selection criteria including at least one of selection by alarm type, selection by using time interval, or selection by using operator identifier; (2) executing alarm handling process discovery to build the alarm handling process model; and (3) returning the alarm handling process model. The alarm handling process mining component also can handle continuous alarm handling process discovery for continuous model building by: (1) storing continuous alarm handling process models; (2) receiving events published by alarm handling process logging component for events generated in response to creation of alarm records and action records; and (3) returns the current, discovered alarm handling process model. The alarm handling process mining component additionally can discover default parameter values for alarm handling automation steps by: (1) selecting alarm handling log data from the alarm handling process logging component by using the selection criteria; (2) using log data to find an association between values of input attributes of task and values of attributes in context of the previous tasks in an execution path; and (3) returns discovered results containing a conditional instruction on threshold value of an attribute, and a copy of a value of an attribute in a context of a previous task in the execution path to the input parameter. The alarm handling process mining component further can generate a rule by: (1) building a condition part of the rule by using the values of attributes in the context of the previous tasks in the execution path; and (2) building an action part of the rule by using a discovered or configured default parameter handling instructions and task execution sequences, wherein the action part is expressed in script language and specifies at least one of execution of a single task without operator input, execution of a single task with some input from the operator, execution of a series of tasks without operator input, or execution of a series of tasks with some input from the operator. The alarm handling process mining component yet further can handle queries on the alarm handling process model to: (1) produce a model from an alarm handling process model based on query selection criteria including at least one of selection by using operator via operator identifier, selection by alarm type, or selection by using time interval; and (2) produce a difference model between at least two models specified by the query selection criteria for the two or more models.

The alarm handling process model can be: (1) is based on graph representation in which nodes in the graph: (a) represent tasks, actions, and methods; and (b) contain action name, input parameters, output parameters, and context, wherein context in a start node includes alarm type identifier, alarm time, camera identifier, location of alarm in field of view of camera, and operator identifier, and context in intermediate nodes include action name, values of input parameters, values of output parameters, and context of a previous node; (2) contain branching rules conditioned on attribute values in the context of a node, wherein conditions include alarm type, time stamp, camera identifier, location of alarm, operator identifier, previous action name, input, and output parameters, and each edge in the graph corresponds to a branching rule from one node to another and contains a confidence measure obtained from data generated by a model building algorithm; and (3) be serialized in metadata.

The system can have additional components. For example, the system can have a rule storage component that supports maintenance of the alarm handling automation rules for each security operator. This rule storage component can store alarm handling automation rules for each operator and returns automation rules upon query. The system can also have a configuration storage component that maintains alarm types, action descriptions, alarm handling process mining algorithms, algorithms to extract rules from alarm handling process models, algorithms for discovery of default parameter assignments, and schema descriptions of alarm handling process models. This configuration storage component: (1) can store alarm types, wherein each record includes a unique alarm type identifier, an alarm semantic description, and types of devices capable of producing such an alarm; (2) can store action descriptions, wherein each record includes a method name, specification of input and output parameters with type description; (3) can store alarm handling process mining algorithms, wherein each record includes algorithm name, executable algorithm implementation code, and an alarm handling process model specification; (4) can store algorithms to extract rules from alarm handling process models, wherein each record includes algorithm name and executable implementation code; (5) can store algorithms for discovery of default parameter assignments, wherein each record includes algorithm name and executable implementation code; and (6) can store schema descriptions of alarm handling process models, wherein each record includes model name, schema definition for the model, an identifier for a model building algorithm, an identifier for a rule extraction algorithm, and an identifier for a default parameter assignment discovery algorithm.

What is claimed is:

1. An automated surveillance system, comprising:

one or more media capture devices that capture media, and that generate media metadata and alarms;

a graphical user interface communicating the alarms and the captured media to security personnel together with alarm handling rules; and a learning module that iteratively learns operation sequences executed by the security personnel during the handling of a set of alarms, extracts alarm handling rules from the operation sequences, and presents the alarm handling rules to the security personnel via said graphical user interface, wherein said learning module presents the alarm handling rules to the security personnel as a possible automation, and the system uses the rules to automate at least part of the alarm handling process when the security personnel expresses agreement with the automation via said graphical user interface.

2. The system of claim 1, wherein said learning module adds the rules to a profile of security personnel in response to the security personnel expressing agreement with the automation.

3. An automated surveillance system, comprising:

one or more media capture devices that capture media, and that generate media metadata and alarms;

a graphical user interface communicating the alarms and the captured media to security personnel together with alarm handling rules; and a learning module that iteratively learns operation sequences executed by the security personnel during the handling of a set of alarms, extracts alarm handling rules from the operation sequences, and presents the alarm handling rules to the security personnel via said graphical user interface, wherein said learning module includes an alarm sequence learning module that learns the sequence of input alarms that interest the security personnel, together with the media capture device, media content, and media metadata for each generated alarm.

4. The system of claim 3, wherein said learning module includes an action sequence learning module that learns a sequence of actions taken by the security personnel reacting to a sequence of the alarms.

5. The system of claim 4, wherein said learning module includes a rule maintenance learning module that learns the sequence of input alarms, the sequence of actions taken by the security personnel, and a score assigned by a security manager evaluating the security personnel's response.

6. The system of claim 1, wherein said learning module extracts the alarm handling rules by discovering an alarm handling process model in the form of a weighted, directed graph.

7. The system of claim 6, further comprising a feedback mechanism for presenting at least part of the alarm handling process model to the security personnel, whereby the security personnel can accept, reject, or update the alarm handling process model.

8. The system of claim 6, further comprising a data mining query mechanism setting data mining conditions on specified data as opposed to an entirety of operation logs.

9. The system of claim 1, further comprising a scoring engine that handles incoming alarms to automatically execute control commands, including PTZ controls, recording controls, monitor controls, and snap shot controls.

10. A multi-camera, distributed surveillance system, comprising:

a surveillance metadata mining system;

a real-time decision making and control system;

distributed data mining agents that interact with multiple sub-function modules in the surveillance system to automate an analysis, learning, optimization, and control process; and an alarm handling process logging component that creates alarm records, assigns a unique session identifier for each stored alarm incident, stores actions taken by a security operator during the handling of an alarm, and extracts alarm handling rules from the stored actions.

11. The system of claim 10, wherein said metadata mining system collects and constructs a context sensitive metadata model for multiple sensors and operators, loads service processing function modules, and creates a repository of alarm and behavior statistical function models in a metadata knowledge warehouse.

12. The system of claim 11, wherein said data mining system observes and controls dynamic association and loading of said distributed data mining agents, said service processing function modules, and said statistical models for a subset of sensors and operators to automate a sequence of surveillance operations.

13. The system of claim 12, wherein the surveillance system comprises interfaces and an execution environment for said data mining agents to interact with said service processing function modules, including alarm handling process logging, alarm handling automation, alarm handling process mining, action rules, and configuration model storage components.

14. The system of claim 10, wherein said alarm handling process logging component stores each alarm with alarm type, alarm time, camera, location within field of view of camera, and assigning a unique identifier for each stored alarm, receives actions taken by the operator from an alarm handling automation component, stores each action information that comprises of alarm identifier, operator identifier, time stamp, action name, input parameter values, and, output parameter values; and sends events when an alarm record is created and when an action record is created.

15. The system of claim 10, further comprising an alarm handling automation component that is connected to alarm handling process logging component to store the actions taken by the security operator, that executes matching alarm handling automation rules, that interacts with the operator to display at least part of a discovered alarm handling process model and obtain feedback of the operator, that is connected to an alarm handling process mining module to start building of alarm handling process models and to retrieve discovered alarm handling process models, and that is connected to a rule storage component to store and retrieve alarm handling automation rules.

16. The system of claim 15, wherein said alarm handling automation component maintains an alarm handling session by creating an alarm handling session object when a new alarm is received, wherein the alarm handling session object records alarm type, alarm time, camera identifier, alarm location, operator identifier, and context information that includes actions taken and input and output parameter values of executed actions during an alarm handling process.

17. The system of claim 15, wherein said alarm handling automation component collects alarm handling process action data by: (1) collecting data associated with executed actions during handling of a particular alarm by using a unique identifier, wherein the actions include at least one of actions initiated by the security guard and automatically executed actions enacted according to automation rules, and data associated with an executed action includes an action/method name, input parameter values, and output parameter values; (2) sending a message to an alarm handling process logging component, wherein the sent message comprises of alarm identifier, operator identifier, time stamp, action name, input parameter values, and output parameter values; and (3) sending a message to the alarm handling process logging component, the sent message being indicative of termination of an alarm handling process for a particular alarm by using a unique identifier of the alarm.

18. The system of claim 15, wherein said alarm handling automation component executes matching rules by: (1) employing a rule matching component that can be configured with a set of rules and supports a rule matching function and a function to re-normalize strength values of a set of rules; (2) retrieving alarm handling automation rules from rule storage associated with the operator and loading the retrieved rules into the rule matching component; (3) retrieving the matched rules from a rule engine by using data collected in an alarm handling session object, including alarm type, alarm time, camera identifier, alarm location, operator identifier, and sequence of actions taken so far, wherein each item in the sequence records action name, values of input, and output parameters; (4) if only one rule is matched, executing actions associated with the matched rule and incrementing a strength attribute of the rule; (5) if more than one rule is matched, listing the rules based on their strength values and asking the user to select which one to execute; and (6) if the user selects one of the rules, then executing actions associated with the selected rule and incrementing its strength attribute.

19. The system of claim 15, wherein said alarm handling automation component creates a new automation rule by: (1) submitting alarm handling process discovery requests to an alarm handling process mining component for ad-hoc alarm handling process mining, the request comprising of selection criteria regarding at least one of alarm type, time interval, or operator identifier; (2) submitting an alarm handling process model retrieval request to an alarm handling process mining component for continuous alarm handling process mining, the request comprising selection criteria regarding at least one of alarm type, time interval, or operator identifier; (3) displaying the discovered alarm handling process model with a threshold on confidence value, with matching execution paths highlighted, and with rules already in effect rendered in a distinctive manner; (4) interacting with a security operator in order to automate one or more execution paths in the discovered alarm handling process model; (5) sending selected steps to an alarm handling process mining process to discover default values for input parameter of actions; (6) displaying discovered default parameter values; (7) collecting selections from the operator regarding whether to automate the assignments by accepting or modifying the values; (8) sending the selections to the alarm handling process mining module to obtain a rule; (9) displays the new rule to the user for final confirmation; and (10) if the user accepts the new rule, saving the new rule to a rule storage component, and loading the new rule to a rule engine.

20. The system of claim 10, further comprising an alarm handling process mining component that discovers an alarm handling process model from alarm handling process log data, processes on-going alarm handling process mining requests and stores associated models, returns discovered alarm handling process models associated with alarm handling process mining requests, and extracts rules from discovered alarm handling process models.

21. The system of claim 20, wherein said alarm handling process mining component:

handles ad-hoc alarm handling process discovery by: (1) selecting alarm handling log data from an alarm handling process logging component by using selection criteria including at least one of selection by alarm type, selection by using time interval, or selection by using operator identifier; (2) executing alarm handling process discovery to build the alarm handling process model; and (3) returns the alarm handling process model;

handles continuous alarm handling process discovery for continuous model building by: (1) storing continuous alarm handling process models; (2) receiving events published by alarm handling process logging component for events generated in response to creation of alarm records and action records; and (3) returns the current, discovered alarm handling process model;

discovers default parameter values for alarm handling automation steps by: (1) selecting alarm handling log data from the alarm handling process logging component by using the selection criteria; (2) using log data to find an association between values of input attributes of task and values of attributes in context of the previous tasks in an execution path; and (3) returns discovered results containing a conditional instruction on threshold value of an attribute, and a copy of a value of an attribute in a context of a previous task in the execution path to the input parameter;

generates a rule by: (1) building a condition part of the rule by using the values of attributes in the context of the previous tasks in the execution path; and (2) building an action part of the rule by using a discovered or configured default parameter handling instructions and task execution sequences, wherein the action part is expressed in script language and specifies at least one of execution of a single task without operator input, execution of a single task with some input from the operator, execution of a series of tasks without operator input, or execution of a series of tasks with some input from the operator;

handles queries on the alarm handling process model to: (1) produce a model from an alarm handling process model based on query selection criteria including at least one of selection by using operator via operator identifier, selection by alarm type, or selection by using time interval; and (2) produce a difference model between at least two models specified by the query selection criteria for the two or more models.

22. The system of claim 20, wherein the alarm handling process model: (1) is based on graph representation in which nodes in the graph: (a) represent tasks, actions, and methods; and (b) contain action name, input parameters, output parameters, and context, wherein context in a start node includes alarm type identifier, alarm time, camera identifier, location of alarm in field of view of camera, and operator identifier, and context in intermediate nodes include action name, values of input parameters, values of output parameters, and context of a previous node; (2) contains branching rules conditioned on attribute values in the context of a node, wherein conditions include alarm type, time stamp, camera identifier, location of alarm, operator identifier, previous action name, input, and output parameters, and each edge in the graph corresponds to a branching rule from one node to another and contains a confidence measure obtained from data generated by a model building algorithm; and (3) is serialized in metadata.

23. The system of claim 10, further comprising a rule storage component that supports maintenance of the alarm handling automation rules for each security operator.

24. The system of claim 23, wherein said rule storage component stores alarm handling automation rules for each operator and returns automation rules upon query.

25. The system of claim 10, further comprising a configuration storage component that maintains alarm types, action descriptions, alarm handling process mining algorithms, algorithms to extract rules from alarm handling process models, algorithms for discovery of default parameter assignments, and schema descriptions of alarm handling process models.

26. The system of claim 25, further wherein said configuration storage component: (1) stores alarm types, wherein each record includes a unique alarm type identifier, an alarm semantic description, and types of devices capable of producing such an alarm; (2) stores action descriptions, wherein each record includes a method name, specification of input and output parameters with type description; (3) stores alarm handling process mining algorithms, wherein each record includes algorithm name, executable algorithm implementation code, and an alarm handling process model specification; (4) stores algorithms to extract rules from alarm handling process models, wherein each record includes algorithm name and executable implementation code; (5) stores algorithms for discovery of default parameter assignments, wherein each record includes algorithm name and executable implementation code; (6) stores schema descriptions of alarm handling process models, wherein each record includes model name, schema definition for the model, an identifier for a model building algorithm, an identifier for a rule extraction algorithm, and an identifier for a default parameter assignment discovery algorithm.

* * * * *